April 23, 1963 J. F. McCONKEY, JR., ETAL 3,087,095

CUSHION MOUNTING FOR ELECTRICAL APPARATUS

Filed Dec. 28, 1959

INVENTORS: J. F. Mc CONKEY
D.J. VAN SLOOTEN
BY Edwin B. Cave
ATTORNEY 3,087,095

CUSHION MOUNTING FOR ELECTRICAL APPARATUS

James F. McConkey, Jr., Ridgefield Park, and David J. Van Slooten, Wayne, N.J., assignors to Bell Telephone Laboratories, Incorporated, New York, N.Y., a corporation of New York Filed Dec. 28, 1959, Ser. No. 862,412
1 Claim. (Cl. 317—101)

This invention relates to mounting devices, generally; and, in particular, to cushion-type mountings for retaining and protecting fragile electronic and electrical components which are subjected to vibration and thermally-induced stresses.

Electronic and electrical components employed in airborne vehicles, such as airplanes and missiles, are often subjected to vibration. Very often, this vibration is of a violent nature. Furthermore, such components are usually situated within a hermetically sealed housing; and, often, a group of these components is imbedded in a matrix fashioned from a potting compound. As a consequence, the heat emitted by such components builds up within the housing to provide a relatively high operating temperature. The deleterious effects of vibration and high temperatures on the operating characteristics of such components as electron discharge devices and solid state devices is a matter of notoriety.

In addition, the shocks and stresses occasioned by vibration and high temperatures often impair the structural security of a packaged assembly of such components. Differences between the coefficients of expansion of some potting compounds and of metallic supporting members is often very great. Consequently, permanent deformations in the matrix, even ruptures, are likely to occur.

Therefore, the objects of this invention include: The attainment of an improved assembly of electronic and electrical apparatus; the improvement, structurally and functionally, of cushion-type mounting devices; the attainment of a mounting device for supporting fragile, heat-emitting apparatus, securely; the attainment of a mounting device for protecting such apparatus from damage due to the stresses occasioned by vibration and heat; the attainment of a mounting device for isolating such apparatus from vibration; the attainment of a mounting device having means associated therewith for draining heat from such apparatus; and, the achievement of these objects with simple, reliable and economical means.

This invention achieves the aforementioned objects, as well as others, by providing an inflated mounting member, including heat-dissipating means associated therewith, for retaining, protecting and cooling fragile, heat-emitting apparatus. In the specific embodiment hereinafter described, and illustrated in the accompanying drawing, the mounting member is an inflated ring-like member of resilient material fitted about the inner periphery of a housing member; part of the inflated member's outer surface being covered with a heat-conducting foil. A plurality of electronic and electrical components is retained by the ring-like member. Each component, or group of them, is imbedded in a potting compound so as to form a modular unit; the ring-like member functioning as a clamp for binding the modular units together so as to form a unitary assembly; the unitary assembly, thus formed, comprising a bound stack, or bundle, of modular units.

Therefore, one of the features of this invention resides in the employment of an inflated retaining member for binding and cushioning an assembly of modular units; these units comprising groups of fragile, heat-emitting apparatus imbedded in a matrix.

Another feature of this invention resides in the use of a foil of heat-conducting material on the surface of the retaining member for draining heat from the modular units.

A further feature of this invention resides in the use of snubber members within the inflated ring to provide additional protection for the components during periods of violent vibration.

Other objects and features, as well as a fuller understanding of the invention, will appear by referring to the following description and claims taken in conjunction with the accompanying drawing in which:

Figure 1:
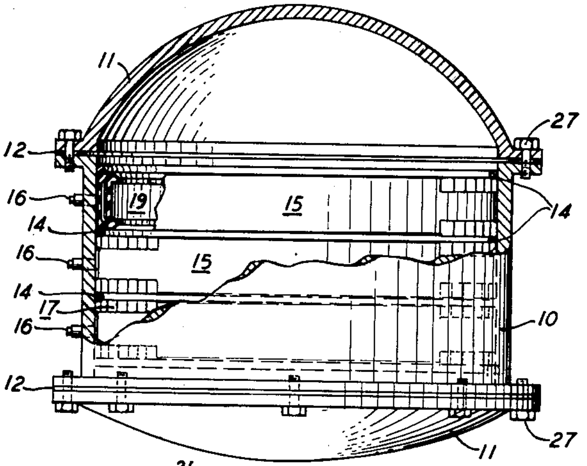
FIG. 1 is a front view, partly cut away, of a packaged assembly of electronic and electrical apparatus.

Referring now to the drawing, especially to FIG. 1, there illustrated is a packaged assembly of electronic and electrical apparatus comprising: a housing 10; a plurality of inflated retaining rings 15 fitted around the housing's inner wall surface; and a like plurality of modular assemblies of electronic and electrical apparatus. Each modular assembly, being designated, generally, by the reference character 19, is retained by an inflated ring 15.

The housing 10 is a hollow cylinder fashioned from a rigid material; such materials as aluminum or hardened plastic-like compounds being suitable for the purpose. End covers 11 with gaskets 12 are provided for each end of the housing so that a hermetically-sealed housing is attainable; the end covers being made from the same material as the housing and the gaskets being fashioned from a soft metal or a rubber-like material. Electrical connectors (not shown in the drawing) may be mounted through the wall of the housing or through the end covers so that electrical wiring from the modular assemblies 19 may be brought out from within the housing. Situated adjacent the housing's inner wall surface and between the retaining rings 15 are the spacer members 14. These members, being fashioned from a resilient material such as rubber or the like, serve to separate the three inflated rings 15. The end covers 11 and the gaskets 12 are fastened to the housing 10 by the fastening members 27, the threaded studs, as shown at FIG. 1.

Figure 2:
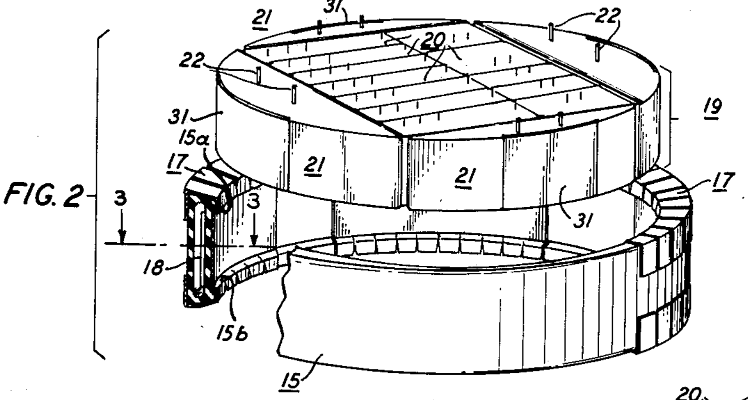
FIG. 2 is an exploded isometric view showing a modular assembly of electronic and electrical apparatus and an inflated ring for retaining the assembly.
Figure 5:
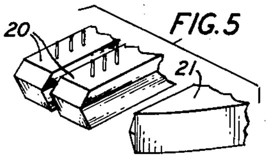
FIG. 5 is an exploded isometric view of part of the modular assembly of FIG. 2, showing, in a general way, the interlocking of the modular units comprising the modular assembly.
Figure 4:
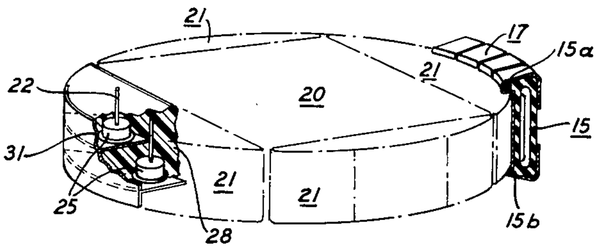
FIG. 4 is an isometric representation, partly cut away, showing the arrangement, in a general way, of electronic and electrical apparatus imbedded within a matrix so as to form a modular unit.

Referring now to the FIGS 2 and 4, each modular assembly 19 includes a number of generally box-shaped modular units 20 as well as the modular units 21, which are in the form of curved segments. As is illustrated at FIG. 2, the modular units 20 and 21 are so arranged that the disk-like modular assembly 19 is formed; the units 20 being arranged contiguously and the segmental units 21 being arranged about the units 20. The modular units 20 and 21 are interlocked to prevent them from sliding out of alignment. One way of interlocking these units is illustrated, generally at FIG. 5 where an exploded view of part of the modular assembly 19 appears. The modular units 20 and 21 have wedge-shaped edges; that is, concave and convex edge portions which mate with each other. Accordingly, the modular assembly 19 is structurally secure because the retaining ring 15, when inflated, and the wedge-shaped interlocks provide mutually perpendicular restraining forces for the retention of the assembly 19.

Each of the modular units, 20 and 21, has electronic and electrical circuit elements imbedded within a matrix of potting material. The techniques of imbedding such circuit elements in a matrix is well known to those persons familiar with this art. For example, one such technique is described in U.S. Patent 2,862,992, granted on December 2, 1958, to E. E. Franz. At FIG. 4 of the accompanying drawing there is an illustration which shows, in a general way, the imbedment of circuitry within a matrix; the circuitry comprising the electronic devices 25 being imbedded in a matrix 28. In addition, heat-conduction members, designated, generally, by the reference character 31, are both imbedded in the matrix and exposed on the surfaces of the modular units, as is shown at FIGS. 2 and 4. The function of these heat-conduction members is discussed in detail hereinafter.

Figure 3:
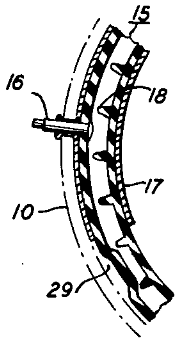
FIG. 3 is a cross-sectional view taken along lines 3—3 of the retaining ring shown in FIG. 2.

As is shown at FIGS. 2 and 4, the terminal members 22 extend from the imbedded circuitry through the matrix 28 so that wiring (not shown) external to the modular units 20 and 21 can electrically interconnect selected modular units. Details relating to the external wiring, and the interconnections of the various modular units and assemblies are neither described herein nor illustrated in the drawing because the techniques and the hardware for achieving these things are known by those persons familiar with this art. Suffice it to suggest, by reference to the FIGS. 1 and 3, that: wiring terminations for the packaged assembly may be made on terminal strips (not shown) located on the inside surfaces of the end covers 11; and, such wiring as is required for interconnecting the three modular assemblies 19 may pass through the channel space 29 (FIG. 3). As many channel spaces 29 as are required for this purpose may be formed in the surfaces of the retaining rings 15 when the rings are moulded.

As is illustrated at FIGS. 1, 2 and 3, each retaining ring 15 is an inflatable circular tube, including a check valve 16 thereon, and a foil 17 of heat-conducting material covering a portion of the ring's outer surface. The check valve 16, being similar to those used on an automobile tire's inner tube, permits the filling of the ring 15 with a compressible fluid such as air, or the like, and prevents the fluid from escaping from the ring. The foil 17 is a thin sheet of material which will conduct heat very well; copper foil or aluminum foil, for example, being materials which are suitable for the purpose. As is illustrated in the drawing, especially at FIGS. 1 and 2 thereat, a portion of the foil 17 abuts against the inner wall surface of the housing 10. The foil 17 covers a portion of the inner periphery of the outer surface of ring 15.

As is shown in the drawing, at FIGS. 2 and 4 thereat, a number of heat-conduction members 31 are associated with the modular units 21. Such heat-emitting devices 25 as transistors, semiconductor diodes, vacuum tubes, etc. are mounted on these members, as suggested by FIG. 4. The members 31 are fashioned from a material which will conduct heat very well; aluminum or copper, for example, being suitable for the purpose. Each of the members 31 has a relatively large portion of its surface area exposed so that heat from the devices 25 will be conducted to this exposed surface. When the modular assembly 19 is retained by the ring 15, the exposed surfaces of the members 31 are in abutment with the foil 17; the foil 17, in turn, conducting the heat from these exposed surfaces to the housing 10. Often, because it is commercially impractical to be so meticulous in assembling the ring 15 and the modular unit 19, an intimate surface-to-surface abutment between the heat-conduction member 31 and the foil 17 is not attainable; a small air space will separate the member's surface and the foil's surfaces. This air space, being a thermal barrier, inhibits the conduction of heat from the member 31 to the foil 17. Accordingly, it is preferred that a thin film of grease be smeared on the foil's surface, or on the heat-conduction member's surface in order to eliminate the air space, thus providing a good heat-conduction path between the member 31 and the foil 17. For example, grease-like substances such as petroleum jelly or a viscous liquid or jellied silicone, such as Dow Corning #4 Compound, are suitable for the purpose.

The retaining ring 15, fashioned into a tubular ring-like form, is made from a resilient material such as rubber, or the like. Inasmuch as the ring 15, as it is employed in the specific embodiment illustrated in this invention, is in an environment at a relatively high temperature, it is preferred that the resilient material employed be able to resist destruction due to high temperatures; for example, a silicone rubber is suitable for the purpose. As is illustrated at FIGS. 2 and 4, the ring 15 has a cross-section which is particularly well adapted for securely retaining the specific modular assembly 19 employed in the instant illustrative embodiment of this invention; that is, the modular assembly 19, having a disk-like form, has its circumferential edge secured between the ring's finger portions, 15*a* and 15*b*, and is in abutment with the ring's inner periphery. It is however, to be understood that the inflatable mounting member may be formed into other shapes, as well as in other cross-sectional forms, depending on the shape of the housing and the shape of the modular assemblies employed.

An easy way to assemble the modular units 19 with their respective retaining rings 15 to achieve the packaged assembly shown at FIG. 1 is as follows:

After having arranged each of the modular units 20 and 21 so as to form the disk-like modular assembly 19, an uninflated retaining ring 15 is easily fitted about the modular assembly's circumferential edge. Although the ring 15 is not inflated, it will, nevertheless, provide sufficient clamping force to keep the modular units 20 and 21 bound together during the assembling process. Subsequently, the modular assemblies 19, so bound by their uninflated retaining rings 15, are positioned within the housing 10; the spacer members 14 serving to separate and position the rings 15 within the housing. Finally, each of the rings 15 is inflated with air or the like through their respective valves 16. As the retaining rings 15 are inflated with air their walls expand. Hence, each modular assembly's modular units 20 and 21 are bounded together more securely. In addition, the now expanded retaining rings 15 apply pressure against the inner wall surface of the housing 10. Advantageously, each modular assembly 19 is tightly clamped by an inflated retaining ring 15 and is held in position within the housing 10.

Advantageously, the rings 15, containing a compressible fluid, provide a high degree of isolation from vibration and shock for the fragile components during periods of vibration. When vibration is particularly violent, the soft rubber snubber members 18 within the ring 15 (shown at FIGS. 2 and 3) provide additional protection against damage to the modular assemblies 19. The snubber members 18 tend to prevent the walls of the retaining ring 15 from coming into contact during periods of violent vibration.

As another advantage, the inflated retaining rings 15 will cause the matrix material 28 to avoid permanent deformation or rupture due to thermally induced expansions of the matrix. The inflated retaining rings 15 are coexpansive with the matrix material in the sense that the rings 15 of the present invention, unlike the prior art metallic retaining rings, will deform in response to the expansion of the matrix material.

Although a specific embodiment of the invention has been illustrated and described, it is to be understood that it is used for the purpose of illustrating the invention and that various modifications may be made thereto without departing from the spirit and the scope of the invention. For example, although the specific embodiment is particularly adaptable for airborne applications of fragile electronic and electrical apparatus, it is to be understood that the invention is applicable as well as for the protection of any fragile object or group of them in non-airborne applications.

What is claimed is:

An assembled package of electronic and electrical apparatus comprising: electronic and electrical components imbedded in a matrix; heat-conduction means extending from the components through the matrix; a cushioning member surrounding the matrix, the cushioning member being inflated with a compressible fluid; a foil of heat-conducting material situated between the cushioning member and the matrix, the foil being in contact with the heat-conduction means; and, a housing for containing the cushioned matrix, a portion of the foil being in contact with the housing.

References Cited in the file of this patent

UNITED STATES PATENTS

| | | |
|---|---|---|
| 1,728,537 | Geiger | Sept. 17, 1929 |
| 2,383,735 | Ray | Aug. 28, 1945 |
| 2,602,843 | Brennan | July 8, 1952 |
| 2,614,243 | Clark | Oct. 14, 1952 |
| 2,728,479 | Wheeler | Dec. 27, 1955 |
| 2,791,731 | Walker | May 7, 1957 |
| 2,796,559 | Feucht | June 18, 1957 |
| 2,833,966 | Goodier | May 6, 1958 |

FOREIGN PATENTS

| | | |
|---|---|---|
| 292,014 | Great Britain | June 14, 1928 |